United States Patent Office 3,287,218
Patented Nov. 22, 1966

3,287,218
ANTIBACTERIAL COMBINATION OF FUSIDIC ACID OR DIHYDROFUSIDIC ACID WITH NOVOBIOCIN OR DIHYDRONOVOBIOCIN
Leif Tybring, Gentofte, Denmark, assignor to Lovens Kemiske Fabrik Produktions-Aktieselskab, Ballerup, Denmark, a Danish company
No Drawing. Filed July 8, 1963, Ser. No. 293,257
Claims priority, application Great Britain, July 10, 1962, 26,525/62
2 Claims. (Cl. 167—65)

This invention relates to a pharmaceutical composition for the treatment of infectious diseases, and to dosage units of the said composition.

More particularly, the invention relates to an antibacterial composition containing a mixture of two or more therapeutically active components, of which at least one is fusidic acid, or dihydrofusidic acid, or one of their salts with pharmaceutically acceptacle bases, and of which at least one of the other active components is novobiocin, dihydronovobiocin, or one of their salts with pharmaceutically acceptable bases.

Of the above active components, dihydrofusidic acid is a hitherto unknown compound which can easily be obtained by a selective hydrogenation of the isolated double bond in the fusidic acid molecule, as described in prior copending U.S. application No. 238,076, filed on November 14, 1962, by W. O. Godtfredsen, assigned to the common co-assignee.

By and large, the antibacterial activity and pharmacological properties of dihydrofusidic acid are identical with those of fusidic acid, although the activity of the former compound against some micro-organisms has proved greater than that of fusidic acid.

According to tests carried out in connection with the present invention it has now been found that by treating or combatting infectious diseases with the above composition an excellent effect is obtained owing to a pronounced synergistic action of the components of the said composition upon one another.

This synergism has been demonstrated to a striking extent by controlled bacteriological experiments using a special technique, by which the rate of growth of an organism, expressed in the doubling time, is determined under conditions where the composition of the substrate, the level of a possible content of antibiotic, and the amount of cells in the culture medium per millilitre, are almost constant. In this technique, a special apparatus was employed in which the nutrient was supplied at intervals while culturing the test organism, the nutrient being added by a pump delivering 0.12 percent of the volume of the culture vessel per stroke. The speed of the pump varied between 0 and 20 strokes per minute, the rate of strokes being determined automatically by means of the turbidity of the culture which was checked every 20 seconds. The rate of the pump strokes was automatically recorded in terms inversely proportional to the doubling time of the organism.

In an experiment employing a strain of Staph. aureus, and a brain/heart infusion broth as the culture medium, a doubling time of 29 to 35 minutes was determined.

When the said broth contained from 1 to 5 $\mu$gm. per ml. of fusidic acid or dihydrofusidic acid, the doubling time at first increased gradually, but after 5–15 hours a decrease set in, and after 20 hours a doubling time was observed which was somewhat longer, but of the same order of magnitude, as that determined when employing a similar broth containing no antibiotics, which indicates the development of strains of the organism being resistant to the said antibiotics.

By substituting novobiocin or dihydronovobiocin for fusidic acid or dihydrofusidic acid in the above experiment, a similar sequence in the doubling times was observed, proving that a development of strains of the organism being resistant to novobiocin or dihydronovobiocin had also taken place.

However, when the broth contained a mixture of 1 $\mu$gm. of fusidic acid or dihydrofusidic acid and 1 $\mu$gm. of novobiocin or dihydronovobiocin per ml., no growth of the said test organism could be demonstrated, even after a period exceeding 40 hours, and a refined calculation showed that the antibiotic concentration, namely a total of 2 $\mu$gm. per ml., equalled to 15 $\mu$gm. per ml. of the individual active components, in producing this stop of growth, proving the said pronounced synergistic action.

It should be mentioned, however, that in clinical treatments a ratio of fusidic acid or dihydrofusidic acid to novobiocin or dihydronovobiocin differing widely from the above ratio may advantageously be used, the adsorption rate and the distribution in the body liquid of the antibiotic components contained in the composition being factors of decisive importance to the choice of the most favourable ratio of the active ingredients, and in the present composition said ratio may vary between 0.05 and 20.0.

In the present composition novobiocin or dihydronovobiocin can be used as their known water-insoluble or water-soluble salts, or even the free acids may be used, if convenient.

The salts of fusidic acid or dihydrofusidic acid, which are suited for the preparation of the present composition include the water-soluble sodium, potassium, ammonium, triethylamine, piperidine, morpholine, cyclohexylamine, and mono- and diethanol amine salts, and the slightly water-soluble calcium, magnesium, dibenzylethylene-diamine, benzyl-$\beta$-phenylethylamine and procaine salts. Among the preferred salts mention may be made of the sodium and diethanol amine salts. Further, the free acids themselves can be ingredients of the composition.

The mixture of the active components can furthermore be mixed with any of the known solid or liquid pharmaceutical carriers and auxiliary compounds, which will not react with the antibiotic substances, in order to obtain compositions which are suited for enteral, parenteral, or local administration.

The resulting composition can either be worked up to pharmaceutical forms of presentation such as tablets, pills, dragees, or suppositories, or the composition can be filled into medical containers such as capsules or ampoules or, as far as mixtures or ointments are concerned, they may be filled into bottles, tubes, or similar containers.

In preferred embodiments of the invention the composition is adapted for oral administration or, alternatively, for local application, the latter e.g. in the form of powders, liquid mixtures, or ointments.

Another object of the invention consists in the selection of a dosage unit which may be conveniently employed in the treatment of patients suffering from infectious diseases.

By the term "dosage unit' is meant a unitary, i.e. a single, dose capable of being administered to the patients, and of being readily handled and packed, remaining as a physically stable unit dose containing either the active material as such, or the active material mixed with solid or liquid diluents or carriers.

If the composition is to be injected, a dosage unit is provided, preferably enclosed in a sealed ampoule, a vial, or a similar container containing a parenterally acceptable, aqueous or oily, injectable solution or dispersion of the active material.

The daily administration of 2 to 4 dosage units each containing at least 25 mg. and not more than 400 mg. of novobiocin or dihydronovobiocin, or non-toxic salts thereof, and at least 50 mg. and not more than 400 mg. of fusidic acid or dihydrofusidic acid, or non-toxic salts thereof, associated with pharmaceutical carriers, the amount of which does not commonly exceed 250 mg., is generally suitable in the treatment of patients.

However, the adequate daily dose of the composition depends on the condition of the patient and the character of the infectious disease for which reason the frequency of administration may vary to some extent.

Particularly suitable in the oral treatment of infectious diseases is a dosage unit containing from 25 to 150 mg. of novobiocin or dihydronovobiocin, preferably in the form of a salt, and from 100 to 300 mg. of fusidic acid or dihydrofusidic acid in the form of a suitable salt.

Thus a tablet containing 125 mg. of the sodium salt of fusidic acid and 125 mg. of the calcium salt of novobiocin, when administered every six hours has proved particularly suitable for the treatment of post-operative infections. As is well known, these infections are often caused by micro-organisms which are resistant to the known antibiotics, and it was noted that they were resolved and healed with remarkable rapidity within a few days when treated with the said tablet.

In agreement with the disclosure given hereinbefore, the preferred pharmaceutical form of presentation of the composition in dosage unit form is capsules, pills or tablets. Enteric coated tablets or pills, e.g. units whose coating is of such a nature that the contents of the unit are only liberated in the intestinal canal, are particularly appropriate.

The present dosage unit may furthermore contain other components which may contribute to increasing the scope of utility of the composition contained in the dosage unit in question, including antibacterially active sulfonamides, nitro-furan derivatives, or other antibiotics and particularly those absorbable by the intestinal canal.

The following examples are illustrative of the compositions of my invention, and the preferred manner of their manufacture.

Example 1

Capsules, each containing 0.125 g. of the sodium salt of fusidic acid and 0.125 g. of the calcium salt of novobiocin, are prepared according to the following procedure—

| Ingredients: | G. |
|---|---|
| Sodium salt of fusidic acid | 125 |
| Calcium salt of novobiocin | 125 |
| Lactose | 27 |
| Magnesium stearate | 3 |

The ingredients are passed through a 60-mesh sieve and mixed for 15 minutes. The mixture is filled into No. 00 gelatine capsules (Parke, Davis and Co.), using a semiautomatic capsule-filling machine shaken by a vibrator. Each capsule contains 280 mg. of the mixture corresponding to 125 mg. of the sodium salt of fusidic acid and 125 mg. of the calcium salt of novobiocin.

Example 2

Coated tablets, each containing 150 mg. of the sodium salt of fusidic acid and 100 mg. of the calcium salt of novobiocin, are prepared according to the following procedure:

*Core.*—150 g. of the sodium salt of fusidic acid is mixed thoroughly with 100 g. of the calcium salt of novobiocin and 80 g. of lactose. The mixture is sifted through a 30-mesh sieve and moistened with a solution of 4 g. of acetylated monoglyceride in carbon tetrachloride, is then granulated by passing through a sieve No. 18, dried and finally mixed with 5 g. of sodium alginate and 4 g. of magnesium stearate.

The well-mixed material is compressed into tablets, deep concave punches of 10 mm. diameter being used.

*Coating.*—The cores are transferred into an ordinary coating pan, and a few layers of a sub-coating of acylated monoglyceride are applied from a 5 percent solution of said monoglyceride in carbon tetrachloride.

The tablets are dried in an air blast, and finally, a sugar coating is applied in the conventional manner.

Inasmuch as the foregoing specification comprises preferred embodiments of the invention, it is understood that variations and modifications may be made herein in accordance with the principles disclosed, without departing from the scope of the invention, which is limited solely by the appended claims.

I claim:
1. The method for combatting strains of *Staph. aureus* bacteria which show decreased susceptibility to fusidic acid, dihydrofusidic acid, novobiocin, and dihydrononvobiocin, which comprises contacting a liquid supporting the growth of said bacteria, with (a) at least 1 $\mu$gm./ml. of a member selected from the group consisting of fusidic acid, dihydrofusidic acid, and the non-toxic salts of these acids with pharmaceutically acceptable bases; and (b) at least 1 $\mu$gm./ml. of a member of the group consisting of novobiocin, dihydronovobiocin, and their non-toxic salts with pharmaceutically acceptable bases.

2. A mixture consisting essentially of: (a) a first member selected from the group consisting of fusidic acid, dihydrofusidic acid, and the non-toxic salts of these acids with pharmaceutically acceptable bases; and (b) a second member selected from the group consisting of novobiocin, dihydronovobiocin, and their non-toxic salts with pharmaceutically acceptable bases, said mixture having in a ratio of (a) to (b) varying between 0.05 and 20.0, effective quantities of each member sufficient to combat strains of *Staph. aureus* in a broth in effective concentrations of the mixture of at least 1 $\mu$gm./ml.

References Cited by the Examiner

UNITED STATES PATENTS

| 3,049,534 | 8/1962 | Wallick | 260—210 |
| 3,072,531 | 1/1963 | Godtfredson et al. | 167—65 |

FOREIGN PATENTS

| 815,517 | 6/1959 | Great Britain. |
| 815,518 | 6/1959 | Great Britain. |
| 815,519 | 6/1959 | Great Britain. |
| 824,785 | 12/1959 | Great Britain. |
| 828,729 | 2/1960 | Great Britain. |

OTHER REFERENCES

Brit. Med. Journal (II–1962): 1188–1189, Nov. 3, 1962.
Brit. Med. Journal (II–1962): 1645–1647, Dec. 22, 1962.
Brit. Med. Journal (I–1963): 190–191, Jan. 19, 1963.
Brit. Med. Journal (I–1963): 535, Feb. 23, 1963.
Brit. Med. Journal (I–1963): 788–794, Mar. 23, 1963.
Brit. Med. Journal (I–1963): 1213–1216, May 4, 1963.

LEWIS GOTTS, *Primary Examiner.*

SHEP K. ROSE, *Assistant Examiner.*